Patented Dec. 26, 1950

2,535,861

UNITED STATES PATENT OFFICE 2,535,861

STABILIZATION OF MONOMERIC 1,1-DICYANO ETHYLENE

Floyd F. Miller, Akron, Ohio, assignor to The B. F. Goodrich Company, New York, N. Y., a corporation of New York No Drawing. Application May 17, 1949, Serial No. 93,815

2 Claims. (Cl. 260—465.8)

This invention relates to the stabilization of monomeric 1,1-dicyano ethylene (also called vinylidene cyanide) and relates more particularly to the use of sulfur dioxide for inhibiting the polymerization of monomeric 1,1-dicyano ethylene.

In copending applications, Serial Nos. 775,149, filed September 19, 1947, now abandoned, 785,520, filed November 12, 1947, now Patent No. 2,476,270, and 6,999, filed February 7, 1948, now Patent No. 2,510,491, methods for the preparation of 1,1-dicyano ethylene are disclosed. It is also disclosed in said copending applications that monomeric 1,1-dicyano ethylene polymerizes readily, especially if impurities, and particularly water, are present in the monomer or if the monomer is exposed to the atmosphere. Accordingly, it is necessary that special precautions be taken during the preparation and storage of 1,1-dicyano ethylene in order to insure highest yields of monomer and to keep it in the monomeric form during periods of storage. Many of the most commonly used stabilizing substances, such as copper, copper salts, phenyl beta-naphthylamine, 1,4-naphthoquinone, para-nitrosodiphenylamine and the like have been found to be unsatisfactory for inhibiting the polymerization of 1,1-dicyano ethylene, and in fact, many of these materials catalyze the polymerization of the monomer.

I have now discovered, however, that sulfur dioxide is an excellent stabilizer for monomeric 1,1-dicyano ethylene. The reason for the stabilizing effect for the monomer possessed by sulfur dioxide is not definitely known, and is quite surprising in view of the fact that sulfur dioxide acts as a catalyst for the polymerization of many unsaturated polymerizable compounds. It is to be understood that the stabilizing effect of sulfur dioxide occurs regardless of the method of preparation of the monomeric 1,1-dicyano ethylene.

The amount of stabilizer utilized is not at all critical and may be varied within wide limits. For example, excellent results are obtained simply by bubbling sulfur dioxide gas into the monomer for a few seconds. In general, however, it may be stated that an amount of approximately .1% to 10% of stabilizer based on the weight of the monomer, is sufficient to inhibit the polymerization of monomeric 1,1-dicyano ethylene for long periods of time. Amounts less than 0.1% and greater than 10%, however, are also effective in preventing polymerization of the monomer.

The following examples illustrate compositions in which sulfur dioxide is used as a stabilizer for monomeric 1,1-dicyano ethylene according to this invention.

Example I

Sulfur dioxide gas is bubbled for 20 seconds into samples of impure monomeric 1,1-dicyano ethylene contained in silica glass containers. The samples are maintained at a temperature of 80° C. and observed constantly until the 1,1-dicyano ethylene darkens and polymerizes to a non-flowing material which in this case requires 22½ hours. A control sample of the same 1,1-dicyano ethylene maintained at the same temperature in the same kind of container polymerizes to a dark, non-flowing gel in only 4¼ hours.

Example II

Samples of highly purified monomeric 1,1-dicyano ethylene containing 6% by weight of sulfur dioxide are prepared and stored in sealed containers and are maintained at a temperature of about 22° C. These samples and control samples of the same purity monomer are observed periodically. The observations are recorded in the table below:

| Days | Control samples | Samples containing 6% $SO_2$ |
|---|---|---|
| 1 | Trace of Polymer | Clear. |
| 4 | More than 1% Polymer | Do. |
| 30 | Approximately 50% Polymer | Do. |
| 67 | Thick slurry of Polymer | Trace of Polymer. |
| 77 | Polymerized to a non-flowing gel. | Trace of Polymer (less than 1%). |

Also, sulfur dioxide may be used together with other stabilizers for the monomer, such stabilizers including the oxides and sulfides of phosphorus, and certain nitro- and hydroxy-substituted benzene derivatives, to give stabilized 1,1-dicyano ethylene compositions which do not polymerize on storage for prolonged periods of time.

The stabilized compositions may also be stored in plastic, metal or other type containers in addition to glass containers, and may be stored at temperatures even in excess of 80° C. with but little decrease in the time the composition remains in the monomeric form.

While certain preferred manners of performing the invention have been disclosed, it is not intended to limit the invention thereto, for numerous variations and modifications will be apparent to those skilled in the art and are included within the scope of the invention as defined in the appended claims.

I claim:

1. A composition comprising monomeric 1,1-dicyano ethylene stabilized with sulfur dioxide.

2. A composition comprising monomeric 1,1-dicyano ethylene stabilized with from .1% to 10% of sulfur dioxide.

FLOYD F. MILLER.

REFERENCES CITED

The following references are of record in the file of this patent:

UNITED STATES PATENTS

| Number | Name | Date |
|---|---|---|
| 2,467,378 | Gilbert | Apr. 19, 1949 |
| 2,476,270 | Ardis | July 19, 1949 |